(No Model.) 2 Sheets—Sheet 1.

T. H. BLAIR & F. H. KELLEY.
CAMERA SHUTTER.

No. 478,909. Patented July 12, 1892.

WITNESSES
Alice A. Perkins
Geo. W. White

INVENTORS
Thomas H. Blair
and Fred H. Kelley
by Alban Andrew their
ATTY (No Model.) 2 Sheets—Sheet 2.

T. H. BLAIR & F. H. KELLEY.
CAMERA SHUTTER.

No. 478,909. Patented July 12, 1892.

WITNESSES
Alice A. Perkins,
Geo. W. White

INVENTORS
Thomas H. Blair
and
Fred H. Kelley
by Albain Andrew their
ATT'Y

UNITED STATES PATENT OFFICE.

THOMAS H. BLAIR AND FRED H. KELLEY, OF BOSTON, MASSACHUSETTS, ASSIGNORS TO THE BLAIR CAMERA COMPANY, OF SAME PLACE.

CAMERA-SHUTTER.

SPECIFICATION forming part of Letters Patent No. 478,909, dated July 12, 1892.

Application filed November 4, 1891. Serial No. 410,872. (No model.)

*To all whom it may concern:*

Be it known that we, THOMAS H. BLAIR and FRED H. KELLEY, both citizens of the United States, and residents of Boston, in the county of Suffolk and State of Massachusetts, have jointly invented new and useful Improvements in Camera-Shutters, of which the following, taken in connection with the accompanying drawings, is a specification.

This invention relates to improvements in camera-shutters, and it is carried out as follows, reference being had to the accompanying drawings, wherein—

Figure 2:
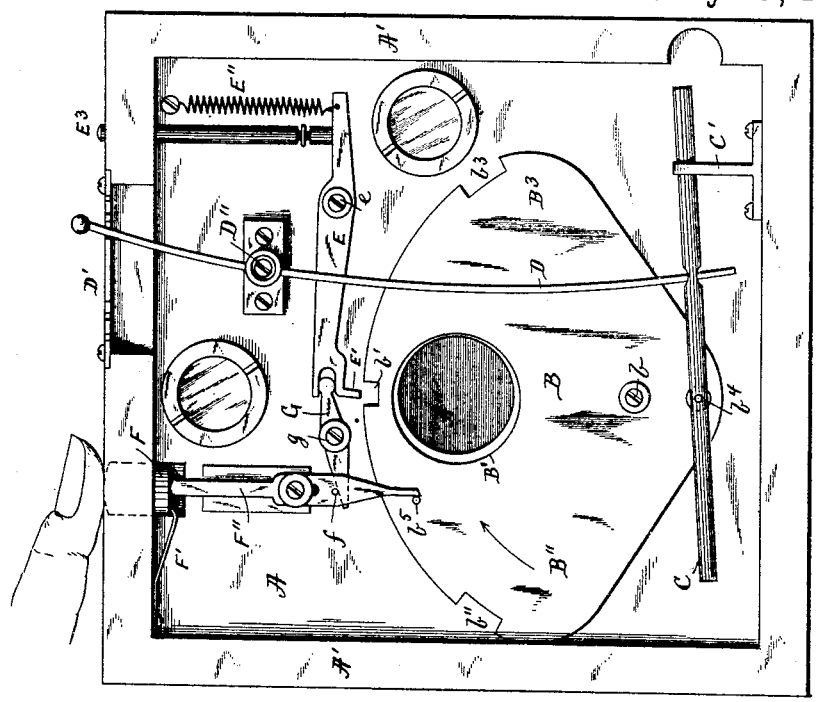
Figure 1:
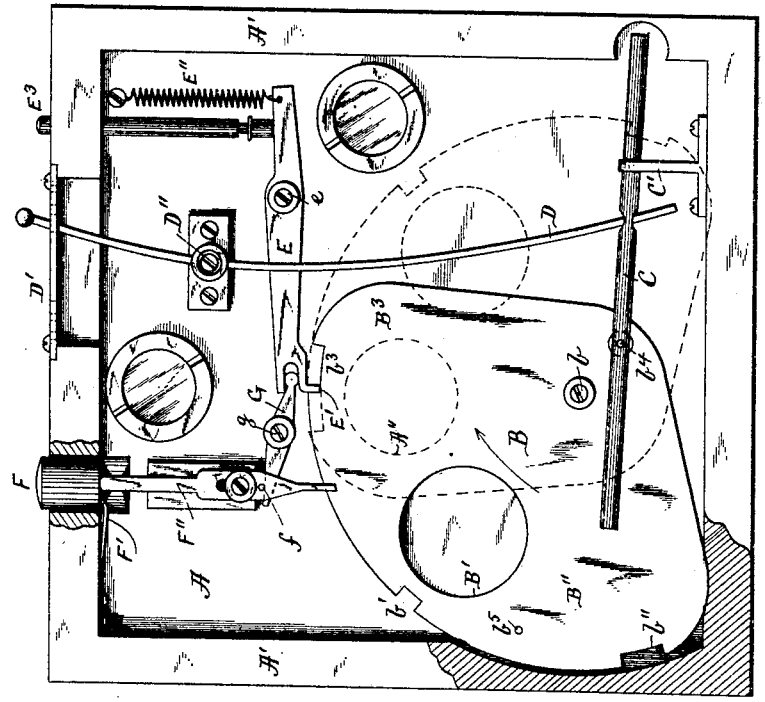
Figure 4:
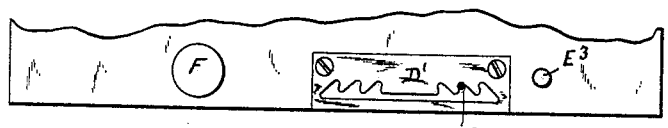
Figure 3:
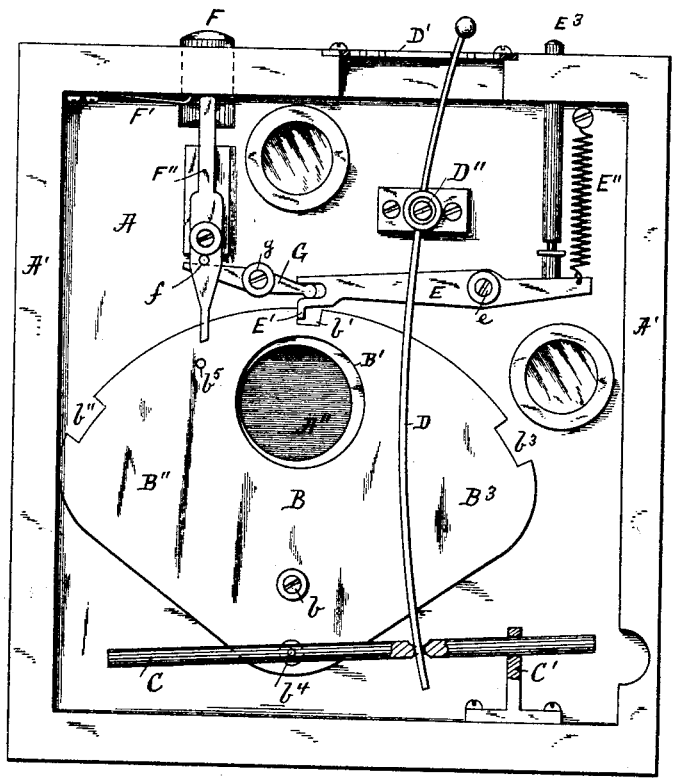

Figure 1 represents an end elevation of a camera, showing the shutter in full and dotted lines in its two opposite normal closed positions. Fig. 2 represents a similar view showing the time-stop button and connected mechanism depressed, arresting the movement of the shutter in making a time-exposure. Fig. 3 represents a similar view showing the shutter in position making a time-exposure; and Fig. 4 represents a partial side view of the camera, showing the notched or toothed rack or locking-plate for securing the outer end of the spring by which the shutter is operated and the press-button, as will hereinafter be more fully shown and described.

A represents the end or front plate of a camera, and A' represents the inclosing rib or projection thereon, as is common in devices of this kind.

A'' is the lens-opening in the diaphragm A, as shown.

B is the oscillating shutter, which is pivoted at $b$ to the front plate A in any suitable manner and has connected to it at $b^4$ a lengthwise-slidable rod C, which is guided in a stationary bracket or bearing C', as shown in Figs. 1, 2, and 3. The rod C is operated in two opposite directions by means of a spring-wire D, the inner end of which passes through a perforation in the rod C or is otherwise loosely connected to the latter in any suitable manner. The outer end of the spring-wire is adapted to be temporarily held and locked in a toothed or notched plate D', secured to the outside of the inclosing rim A', as shown in the drawings.

D'' is the fulcrum for the spring-wire D.

B' is the shutter-opening, which is adapted to pass by the lens-opening A'' when the shutter is swung from one to the other of its two opposite positions. On each side of said shutter-opening is a solid portion B'' and B³, adapted, one at a time, to close the lens-opening when the shutter is in its normal position, as shown in Fig. 1.

$b'$, $b''$, and $b^3$ are locking notches or recesses on the circumference of the shutter B, the object of which will hereinafter be described.

In connection with such oscillating shutter we use an instantaneous releasing device constructed as follows: It is composed of a lever E, pivoted at $e$ intermediate its ends and having a tooth or projection E' at one extremity, which when in its normal position is held within either of the end notches $b''$ or $b^3$ by the influence of a spring E''. (Shown in Figs. 1, 2, and 3.)

E³ is a press-button suitably guided, having its inner end resting on the lever E and having its outer end projecting slightly beyond the outside of the camera, as shown.

If it is desired to make an instantaneous exposure and the shutter is in the normal position, (shown in full lines in Fig. 1,) all that is necessary to do is to bend the wire D, as shown in said Fig. 1, by locking its outer end in any one of the right notches in the plate D'. If now the button E³ is depressed, the lever E is tripped sufficiently to cause the lever projection E' to be withdrawn from the shutter-notch $b^3$, by which the shutter is liberated and caused to be swung quickly by the influence of the spring D in the direction of the arrow shown in Fig. 1 until it reaches its normal position. (Shown in dotted lines in said Fig. 1.) During such motion of the shutter an instantaneous exposure takes place when the shutter-opening B' passes by the lens-opening A'', as is common in shutters of this kind. When the operator relieves his pressure on the button E³, the spring E'' will automatically cause the lever projection E' to enter the notch $b''$ on the periphery of the shutter. If it is desired to make another instantaneous exposure, the spring D is bent in the opposite direction and the button E³ depressed, as before, causing the shutter to swing from the position shown in dotted lines in Fig. 1 to the position shown in full lines in said figure, and so on.

In connection with the instantaneous shutter-releasing mechanism we use a time-exposure setting and releasing device, which is constructed as follows: It consists of a press-button F, passing through a perforation in the camera-wall and normally held in position, as shown in Figs. 1 and 3, by the influence of a spring F'. To the button F is secured a rod or spindle F'', which is guided in a suitable manner and provided with a pin or projection $f$, which lies in contact with a lever G, pivoted at $g$ intermediate its ends and jointed in a suitable manner to the lever E, as shown in Figs. 1, 2, and 3.

$b^5$ is a projection on the shutter B, the object of which will hereinafter be described.

The operation of the time-exposure device is as follows: Supposing the shutter B and its spring D to be in the positions shown by full lines in Fig. 1 and a time-exposure is desired, all that is necessary to do is to depress the button F, by which the release-lever E is tripped, as shown in Fig. 2, causing the shutter to be released and swung (by the influence of the spring D) in the direction of the arrow shown in Fig. 2 until the shutter projection $b^5$ comes in contact with the inner end of the press-button rod F'', as shown in Fig. 2, causing the shutter to be arrested and its opening to coincide, or nearly so, with the lens-opening. The operator then relieves the pressure on the button F, causing the rod F'' to be withdrawn from the shutter projection $b^5$ and causing the lever projection E' to enter the middle shutter-notch $b'$, by which the shutter is held in an exposed position, as shown in Fig. 3. When the desired time-exposure is made, the shutter is closed by the depression of either of the press-buttons $E^5$ or F, as may be desired, causing the said shutter to be automatically swung to one of its normal closed positions.

Having thus fully described the nature, construction, and operation of our invention, we wish to secure by Letters Patent and claim—

The combination, with a plate A, having a lens-opening, and an oscillatory shutter B, having an exposure-orifice B' and notches at one edge, of a lengthwise-sliding rod C, pivotally connected with the shutter in proximity to the pivot on which the latter oscillates, a spring D, having a fulcrum D'' and connected at its inner extremity with the lengthwise-sliding rod, a lever E, pivoted intermediate its ends and provided at one extremity with a tooth E', adapted to engage the notches at the edge of the oscillatory shutter, a push-button $E^3$, acting against the other end of the lever to move its tooth from engagement with the shutter-notches, a spring E'', acting on the lever to force its tooth into the shutter-notches, a lever G, loosely engaged with the toothed lever, a push-button F, and a rod or spindle F'', operated by the push-button, provided with a pin $f$, and having its extremity adapted to move into the path of a projection on the shutter, substantially as described.

In testimony whereof we have signed our names to this specification, in the presence of two subscribing witnesses, on this 3d day of November, A. D. 1891.

THOMAS H. BLAIR.
FRED H. KELLEY.

Witnesses:
ALBÅN ANDRÉN,
ALICE A. PERKINS.